United States Patent

[11] 3,629,979

[72] Inventors Walter A. Albers, Jr.
Northville;
Don E. Swets, Sterling Heights, both of Mich.
[21] Appl. No. 28,772
[22] Filed Apr. 15, 1970
[45] Patented Dec. 28, 1971
[73] Assignee General Motors Corporation
Detroit, Mich.

[54] PROCESS OF ABRADING WITH GERMANIUM DIOXIDE
3 Claims, 5 Drawing Figs.

[52] U.S. Cl. .................................................. 51/317, 51/322
[51] Int. Cl. .................................................. B24b 1/00
[50] Field of Search .................................................. 51/322, 281, 320, 317

[56] References Cited
OTHER REFERENCES

Mellor, Comprehensive Treatise on Inorganic & Theoretical Chemistry, Feb. 11, 1927, Vol. 7, pages 265– 268, QD31M4

Primary Examiner—Donald G. Kelly
Attorneys—William S. Pettigrew and R. J. Wallace ABSTRACT: The abrasive qualities of tetragonal germanium dioxide are described, along with compositions and articles made with a tetragonal germanium dioxide abrasive. Techniques for using tetragonal germanium dioxide as an abrasive are also described.

PATENTED DEC 28 1971  3,629,979

INVENTORS
Walter A. Albers Jr., &
BY   Don E. Swets
R. J. Wallace
ATTORNEY

PROCESS OF ABRADING WITH GERMANIUM DIOXIDE

BACKGROUND OF THE INVENTION

This invention relates to abrasives and more particularly to the use of tetragonal germanium dioxide as an abrasive.

Germanium dioxide occurs naturally in both an amorphous and crystalline form. However, the naturally occurring crystalline form is hexagonal in structure and does not exhibit the hardness necessary for utility as an abrasive. On the other hand, germanium dioxide also has another crystalline form, a tetragonal structure. This other form has been produced in small amounts in the past but its abrasive qualities were not appreciated. This other crystalline form is actually the thermodynamically stable form under standard conditions, even though it is not the naturally occurring form. Hence, once germanium dioxide assumes the tetragonal crystalline form it prefers to remain in that state.

Techniques have been developed in the past for converting the unstable hexagonal form into the stable tetragonal form, without ever recognizing the abrasive qualities of the tetragonal form. We have become acquainted with techniques by which hexagonal germanium dioxide can be expeditiously and economically converted into crystals of tetragonal germanium dioxide.

We have found that crystals of tetragonal germanium dioxide exhibit a hardness approaching that of aluminum oxide, have good fracture characteristics that form sharp edges, and have a toughness or resistance to fracture that is desirable of good abrasives. While germanium dioxide has a fairly low melting point temperature as compared to many abrasives, approximately 1,050° C., it can still be quite satisfactorily employed, especially if cooled when it is used. We have found it to be a particularly effective lapping compound for germanium, silicon, agate, and Pyrex glass.

SUMMARY OF THE INVENTION

It is, therefore, an object of this invention to provide a new abrasive composition that comprises tetragonal germanium dioxide. Another object of the invention is to provide abrasive articles in which the abrasive surface comprises tetragonal germanium dioxide. Still a further object of the invention is to provide a method of surface finishing which involves abrading the surface with particles of tetragonal germanium dioxide. These and other objects of the invention are obtained with abrasive compounds and articles made of tetragonal germanium dioxide and by using such compounds and articles with appropriate cooling means.

BRIEF DESCRIPTION OF THE DRAWING

Other objects, features and advantages of the invention will become more apparent from the following description of preferred embodiments thereof and from the drawing, in which.

DESCRIPTION OF THE PREFERRED EMBODIMENTS

Tetragonal germanium dioxide has a Knoop hardness of approximately 2,050, which corresponds to a hardness on the Moh scale of almost 9. It is, therefore, considerably harder than garnet and topaz, as well as cutting tool steels, and only slightly softer than aluminum oxide, which has a Knoop hardness of about 2,100.

In addition when the tetragonal germanium dioxide crystallite fractures the resulting particles are multifaceted and have sharp edges analogous to aluminum oxide. Also analogously, while the crystal exhibits toughness or resistance to fracture, it is not quite as tough as aluminum oxide.

On the other hand, tetragonal germanium dioxide can be economically produced by conversion from the hexagonal crystallite form. The hexagonal crystallite form is naturally the occurring form that is a byproduct of the mining of Bauxite. To induce the conversion, about 1 percent, by weight, lithium carbonate is added to hexagonal germanium dioxide, and the mixture heated in air at about 875° C. for 24 hours. The resulting powder is substantially 100 percent tetragonal germanium dioxide. It is preferably flushed with dilute aqueous hydrofluoric acid solution and then water to remove any residual hexagonal crystals that are left unconverted. The tetragonal germanium dioxide powder is then ready for grinding into the appropriate particle sizes. The particles resulting from the conversion process are normally large agglomerates of small grained materials. They are crushed into the smaller particle size desired and sieved to separate the various particle sizes desired.

In addition, U.S. Ser. No. (A-13,137), filed in the name of Don E. Swets concurrently with this application, describes another technique for directly growing large crystals of tetragonal germanium dioxide. Relatively large single crystals can be produced at about 1,050° C. by progressive solidification of tetragonal germanium dioxide onto a seed crystal from a melt of germanium dioxide containing about 10 mole percent lithium oxide. Crystals grown in this manner can be crushed down to any smaller particle size that is desired in the conventional manner for producing smaller grit sizes of abrasive.

Figure 1:
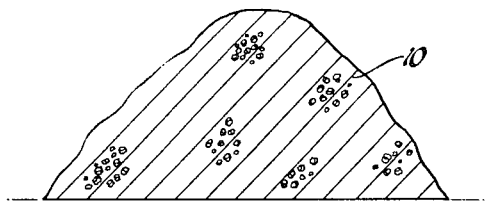
FIG. 1 shows an abrasive aggregate comprising small crystals of tetragonal germanium dioxide.
Figure 2:
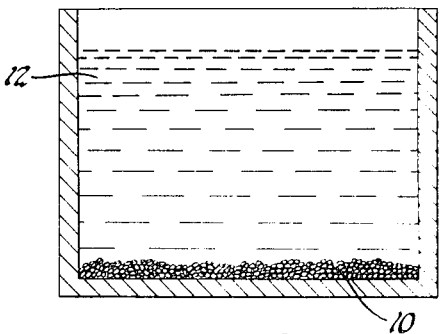
FIG. 2 schematically shows a lapping compound in which particles of tetragonal germanium dioxide are mixed with a fluid vehicle.

A quantity 10 of particulate tetragonal germanium dioxide thus formed is shown in FIG. 1. Of course, while the particulate material can be used dry and in loose form it is preferred to use it in other ways. For example, it can be carried in a suitable fluid medium or vehicle 12 such as water or oil, if it is to be used as a lapping or polishing compound. FIG. 2 illustrates such a mixture in which particles 10 of tetragonal germanium dioxide are disposed in the bottom of a container filled with water 12. Before the compound would be used it should be stirred to more uniformly disperse the particles throughout the water. Other means (not shown) can also be included to maintain the particles dispersed.

Figure 3:
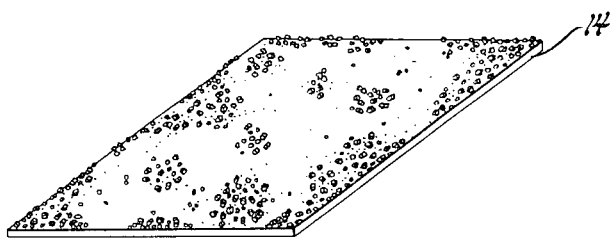
FIG. 3 is an isometric elevational view illustrating an abrasive paper having abrasive particles made of tetragonal germanium dioxide.
Figure 4:
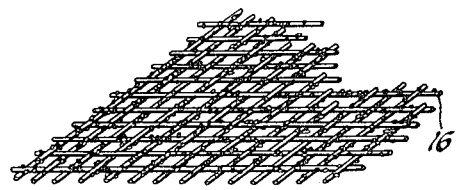
FIG. 4 is an isometric elevational view showing a coarse metal screen coated with particles of tetragonal germanium dioxide.

FIGS. 3 and 4 illustrate two types of abrasive articles which can be made with the tetragonal germanium dioxide. FIG. 3 shows an abrasive paper of the usual type in which an adhesive such as a phenolic resin bonds the abrasive particles to a paper backing 14. In this case the abrasive particles are tetragonal germanium dioxide. In FIG. 4 a supporting metal or plastic screen 16 has a copper or nickel coating with the tetragonal germanium dioxide abrasive particles embedded in the metal coating. Hence, the metal coating retains the abrasive on the screen. Such a product can be produced by electroplating the metal coating onto the screen from an electroplating bath containing the abrasive particles dispersed in it. If the particles are large, intermittent vigorous agitation during plating may be required to suspend them and then allow them to come to rest on the screen, where they will be locked in place. If the screen is nonconductive, it will of course have to be pretreated to make its surface conductive before it can be electroplated. The particles may also be attached with an adhesive.

Since tetragonal germanium dioxide has a lower melting point temperature than conventional abrasives, best results have been obtained by cooling the surface region being abraded, the abrasive or both. The abrasive screen shown in FIG. 4 has a high rate of heat transfer and provides a particularly effective abrasive article for this invention. In fact, it may be desired to use this form of abrasive article for rotary finishing tools, using auxiliary pumping means to even further cool the article and the workpiece being abraded.

Figure 5:
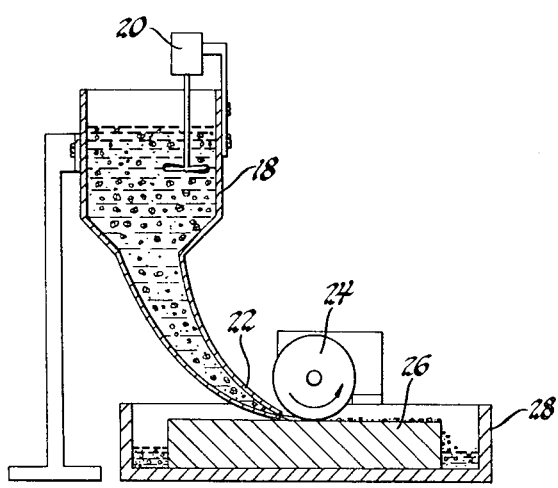
FIG. 5 shows a schematic view of an apparatus for lapping surfaces with an aqueous dispersion of tetragonal germanium dioxide particles.

FIG. 5 schematically shows an apparatus for polishing a surface in accordance with this invention. The apparatus has a reservoir 18 of polishing compound with a stirrer assembly 20. The polishing compound is an aqueous dispersion of tetragonal germanium dioxide particles with the stirrer assembly 12 maintaining the particles uniformly dispersed in the water. The reservoir has an outlet 22 adjacent to copper roller 24 which engages a germanium substrate 26 that rests within sink 28. As the copper roller 24 traverses the surface of substrate 26, the interface between the two is continuously flooded with the polishing compound, providing a continuous source of coolant and abrasive particles sufficient to polish the surface of substrate 26 and maintain its average temperature low.

It is to be understood that although this invention has been described in connection with certain specific examples thereof no limitation is intended thereby except as defined in the appended claims.

We claim:

1. The process of surface finishing which comprises abrading a surface with particles of tetragonal germanium dioxide while concurrently cooling said particles to restrain a phase transformation to a state of lesser hardness.

2. The process of surface finishing which comprises abrading a surface with a mixture containing a liquid coolant and granular tetragonal germanium dioxide.

3. The process of polishing germanium surfaces which comprises abrading a germanium surface with a mixture containing a liquid vehicle and finely crushed particles of monocrystalline tetragonal germanium dioxide.

* * * * *